US011388343B2

(12) United States Patent
Zhou et al.

(10) Patent No.: US 11,388,343 B2
(45) Date of Patent: Jul. 12, 2022

(54) PHOTOGRAPHING CONTROL METHOD AND CONTROLLER WITH TARGET LOCALIZATION BASED ON SOUND DETECTORS

(71) Applicant: SZ DJI TECHNOLOGY CO., LTD., Shenzhen (CN)

(72) Inventors: Changxing Zhou, Shenzhen (CN); Zexun Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/060,936

(22) Filed: Oct. 1, 2020

(65) Prior Publication Data

US 2021/0021763 A1 Jan. 21, 2021

Related U.S. Application Data

(63) Continuation of application No. PCT/CN2018/101129, filed on Aug. 17, 2018.

(51) Int. Cl.
| | |
|---|---|
| H04N 5/232 | (2006.01) |
| G10L 25/51 | (2013.01) |
| G01S 3/808 | (2006.01) |
| H04R 3/00 | (2006.01) |
| H04R 1/32 | (2006.01) |

(52) U.S. Cl.
CPC ......... *H04N 5/23299* (2018.08); *G01S 3/808* (2013.01); *G10L 25/51* (2013.01); *H04R 1/326* (2013.01); *H04R 3/005* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 5,778,082 A | 7/1998 | Chu et al. | |
| 6,593,956 B1 | 7/2003 | Potts et al. | |
| 7,495,998 B1 | 2/2009 | Deligeorges et al. | |
| 9,560,319 B1* | 1/2017 | Pan | H04N 21/233 |
| 9,643,722 B1* | 5/2017 | Myslinski | G06K 9/00711 |
| 9,693,168 B1* | 6/2017 | Carlsson | H04R 5/02 |
| 9,693,169 B1* | 6/2017 | Carlsson | G01S 15/88 |
| 10,638,222 B1* | 4/2020 | Mehra | H04R 3/005 |
| 2005/0110874 A1 | 5/2005 | Song | |

(Continued)

FOREIGN PATENT DOCUMENTS

| | | |
|---|---|---|
| CN | 101511000 A | 8/2009 |
| CN | 102186051 A | 9/2011 |

(Continued)

OTHER PUBLICATIONS

The World Intellectual Property Organization (WIPO) International Search Report and Written Opinion for PCT/CN2018/101129 dated May 15, 2019 7 Pages.

*Primary Examiner* — Stefan Gadomski
(74) *Attorney, Agent, or Firm* — Anova Law Group, PLLC

(57) ABSTRACT

A photographing control method includes detecting a target sound from a target using a plurality of sound detectors of a mobile platform carrying a sensor, determining a target location of the target according to the target sound detected using the plurality of sound detectors, and controlling the mobile platform based at least in part on the target location.

16 Claims, 8 Drawing Sheets

(56) References Cited

U.S. PATENT DOCUMENTS

| | | | | |
|---|---|---|---|---|
| 2010/0111324 | A1* | 5/2010 | Yeldener | H04R 1/406 381/92 |
| 2013/0202120 | A1* | 8/2013 | Bickel | G08B 13/1672 381/56 |
| 2014/0334645 | A1* | 11/2014 | Yun | G10L 15/22 381/110 |
| 2016/0063987 | A1* | 3/2016 | Xu | H04R 3/005 381/71.12 |
| 2016/0084937 | A1* | 3/2016 | Lin | G01S 5/18 367/125 |
| 2016/0187453 | A1* | 6/2016 | Wang | G01S 3/808 367/127 |
| 2016/0293183 | A1* | 10/2016 | Kim | G10L 17/02 |
| 2016/0322066 | A1* | 11/2016 | Sharifi | G06F 16/683 |
| 2017/0097645 | A1 | 4/2017 | Garland | |
| 2017/0154638 | A1* | 6/2017 | Hwang | G01S 3/803 |
| 2017/0220036 | A1 | 8/2017 | Visser et al. | |
| 2017/0264999 | A1* | 9/2017 | Fukuda | H04N 5/2252 |
| 2017/0265014 | A1* | 9/2017 | Shintani | H04R 3/12 |
| 2017/0330583 | A1* | 11/2017 | Lee | H04R 3/005 |
| 2018/0025498 | A1* | 1/2018 | Omari | G06K 9/00711 348/144 |
| 2018/0139560 | A1* | 5/2018 | Shi | H04S 7/301 |
| 2018/0237033 | A1* | 8/2018 | Hakeem | B60R 11/0247 |
| 2019/0098222 | A1 | 3/2019 | Yokomizo | |
| 2019/0214019 | A1* | 7/2019 | White | H04R 1/326 |
| 2019/0394564 | A1* | 12/2019 | Mehra | H04R 3/005 |
| 2020/0176015 | A1* | 6/2020 | Nakahara | G01S 11/14 |
| 2020/0301651 | A1* | 9/2020 | Georganti | H04R 3/005 |
| 2020/0357368 | A1* | 11/2020 | Yoshino | G10H 1/0008 |
| 2021/0141050 | A1* | 5/2021 | Janssen | G10L 15/22 |

FOREIGN PATENT DOCUMENTS

| | | | | |
|---|---|---|---|---|
| CN | 103002250 | A | | 3/2013 |
| CN | 103929707 | A * | | 7/2014 |
| CN | 103941223 | A | | 7/2014 |
| CN | 104469154 | A | | 3/2015 |
| CN | 205619955 | U * | | 10/2016 |
| CN | 106679651 | A | | 5/2017 |
| CN | 106842128 | A * | | 6/2017 |
| CN | 106899806 | A | | 6/2017 |
| CN | 108476288 | A | | 8/2018 |
| CN | 110431434 | A * | 11/2019 | H04L 67/12 |
| JP | 2008158868 | A | | 7/2008 |
| JP | 2017220900 | A | | 12/2017 |
| WO | 2016190994 | A1 | | 12/2016 |
| WO | 2017212796 | A1 | | 12/2017 |
| WO | 2018137134 | A1 | | 8/2018 |

* cited by examiner

PHOTOGRAPHING CONTROL METHOD AND CONTROLLER WITH TARGET LOCALIZATION BASED ON SOUND DETECTORS

CROSS-REFERENCE TO RELATED APPLICATION

This application is a continuation of International Application No. PCT/CN2018/101129, filed Aug. 17, 2018, the entire content of which is incorporated herein by reference.

TECHNICAL FIELD

The present disclosure relates to control method and apparatus, more particularly, to a photographing control method, a controller, and a mobile platform including the controller.

BACKGROUND

A handheld gimbal equipped with a camera or a smartphone with a camera can be mobile during capturing images, and thus can take images of both still objects and moving objects. The handheld gimbal may cause a camera to move or rotate, such that the camera can be placed at a certain angle or position.

In conventional technologies, a handheld gimbal cannot take images of a target according to a sound from the target. A microphone of a handheld gimbal is relatively easy to be affected by external environments, such as wind noise.

SUMMARY

In accordance with the present disclosure, there is provided a photographing control method. The photographing control method includes detecting a target sound from a target using a plurality of sound detectors of a mobile platform carrying a sensor, determining a target location of the target according to the target sound detected using the plurality of sound detectors, and controlling the mobile platform based at least in part on the target location.

Also in accordance with the present disclosure, there is provided a controller. The controller includes a processor and a memory storing instructions. The instructions, when executed by the processor, cause the processor to detect a target sound from a target through a plurality of sound detectors of a mobile platform carrying a sensor, determine a target location of the target according to the target sound detected through the plurality of sound detectors, and control the mobile platform based at least in part on the target location.

Also in accordance with the present disclosure, there is provided a mobile platform. The mobile platform includes a sensor carried by a main body of the mobile platform, a plurality of sound detectors carried by the main body of the mobile platform, a processor, and a memory storing instructions. The instructions, when executed by the processor, cause the processor to detect a target sound from a target through the plurality of sound detectors, determine a target location of the target according to the target sound detected through the plurality of sound detectors, and control the mobile platform based at least in part on the target location.

DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

Figure 1:
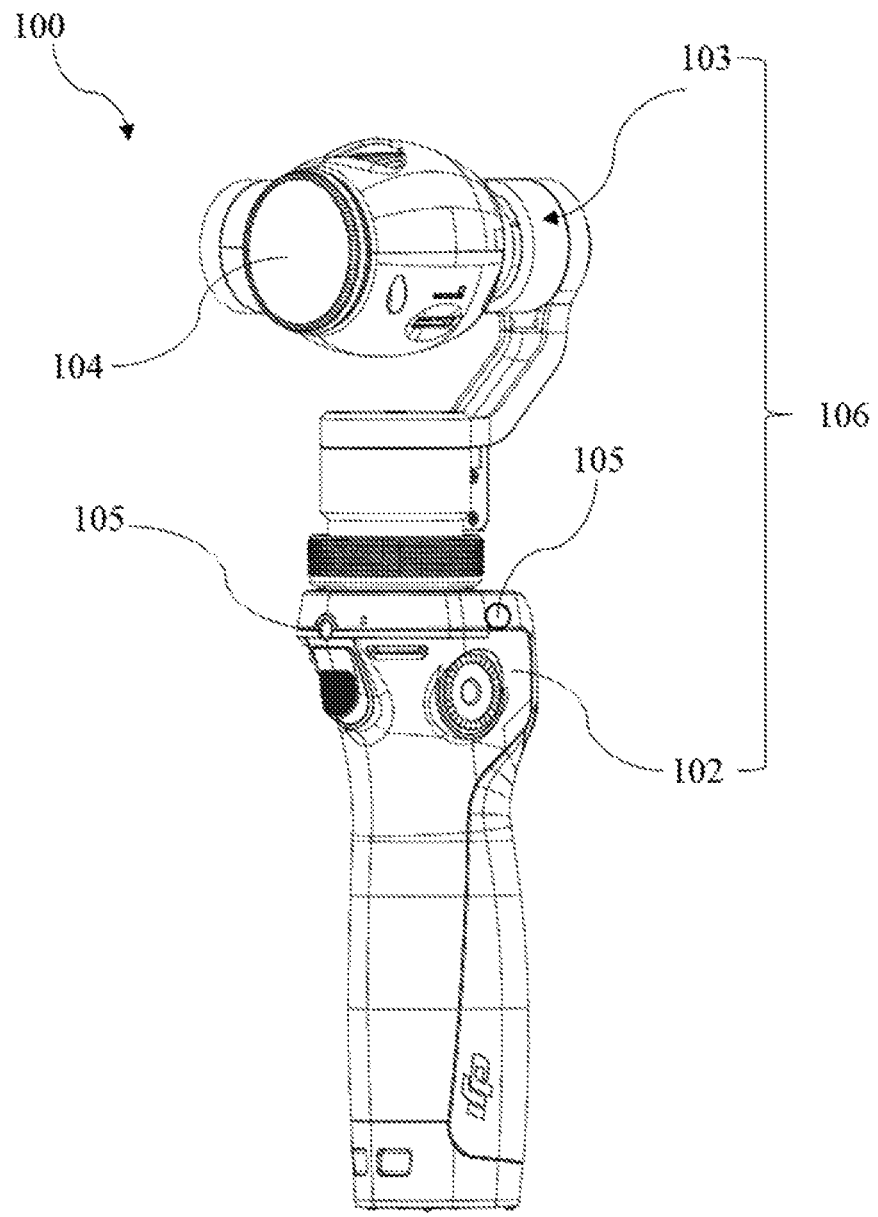
FIG. 1 illustrates a schematic diagram showing an exemplary application scenario of image processing according to various disclosed embodiments of the present disclosure.
Figure 2:
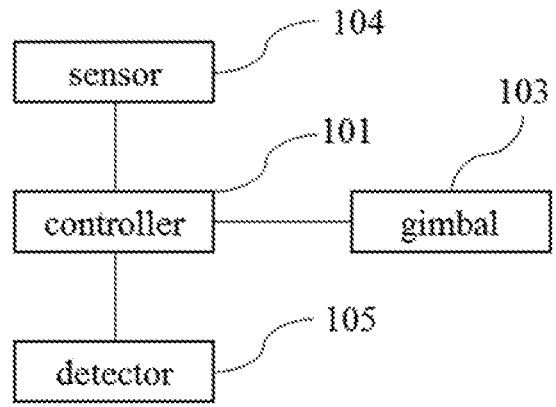
FIG. 2 illustrates a schematic circuit diagram of mobile platform shown in FIG. 1 according to various disclosed embodiments of the present disclosure.

FIG. 1 illustrates a schematic diagram showing an exemplary application scenario of image processing according to various disclosed embodiments of the present disclosure. FIG. 2 illustrates a schematic circuit diagram of the mobile platform shown in FIG. 1 according to various disclosed embodiments of the present disclosure. As shown in FIGS. 1 and 2, a mobile platform 100 includes a controller 101, a sensor 104, a plurality of sound detectors 105 and a main body 106. The sensor 104 may be carried by the main body 106 of the mobile platform 100. The sound detectors 105 may be carried by the main body 106 of the mobile platform 100.

The mobile platform 100 may include, for example, a handheld platform or a vehicle, such as an unmanned aerial vehicle or a ground-based mobile vehicle. In the illustrated embodiment, the mobile platform 100 may be a handheld platform. The main body 106 may include a platform body 102 and a gimbal 103. The sensor 104 is carried by the gimbal 103. The plurality of sound detectors 105 are carried by the platform body 102 and/or the gimbal 103. The gimbal 103 couples the sensor 103 to the platform body 102.

The controller 101 may include a photographing controller and/or a gimbal controller. The controller 101 may include a processor and a memory storing instructions. The instructions, when executed by the processor, cause the processor to perform a photographing control method consistent with the disclosure, such as one of the example methods described below. In some embodiments, the controller may be arranged in the platform body. In some other embodiments, the controller may be arranged outside the platform body.

The sensor 104 may include, for example, a camera, a smartphone including a camera, or another device including a camera.

The number of the sound detectors 105 may be, for example, four or more. In some embodiments, each two of the sound detectors have a distance between the two sound detectors larger than a preset value. The plurality of sound detectors 105 may include, for example, a plurality of microphones.

In some embodiments, the plurality of sound detectors 105 may be arranged at the platform body 102 directly. In some other embodiments, the plurality of sound detectors 105 may be coupled to the platform body 102 through the gimbal 103. In some embodiments, the mobile platform 100 may include a multirotor UAV having a plurality of arms each supporting one of rotors of the UAV that drive the UAV to fly in the air. In these embodiments, each of the plurality of sound detectors 105 can be arranged at one of the arms, such as at a distal end of the one of the arms that is distal from a center body of the UAV. In some embodiments, each of the plurality of sound detectors 105 can be arranged at one of the arms beneath the corresponding rotor.

Figure 3:
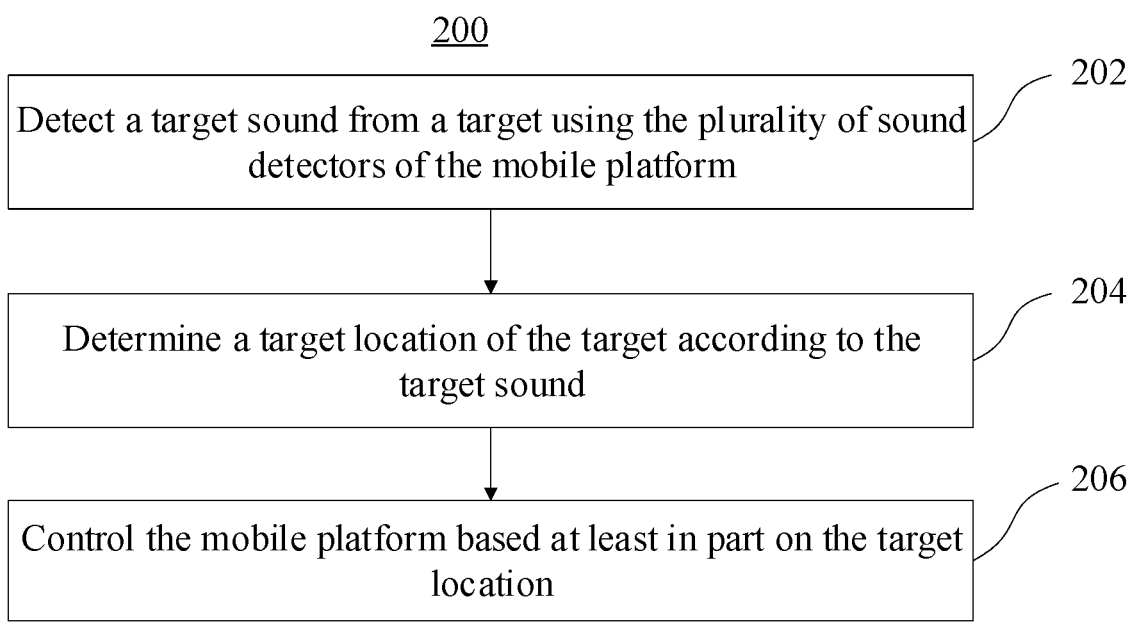
FIG. 3 is a flow chart of an exemplary photographing control method according to various disclosed embodiments of the present disclosure.

FIG. 3 is a flow chart of an exemplary photographing control method according to various disclosed embodiments of the present disclosure. With reference to FIG. 3, the photographing control method is described below.

At 202, a target sound from a target is detected using the plurality of sound detectors of the mobile platform.

The target may include, for example, a human face or an object that can generate sounds.

In some embodiments, a sensed sound may be detected through one of the sound detectors, and an intensity of the sensed sound may be obtained. Further, it may be determined whether the intensity is greater than an intensity threshold. It may be determined that the sensed sound includes the target sound in response to determining that the intensity is greater than the intensity threshold.

In some embodiments, if the intensity of the sensed sound is not greater than the intensity threshold, a frequency-dependent intensity analysis may be performed on the sensed sound to obtain a signal-to-noise ratio. Further, it may be determined whether the signal-to-noise ratio is greater than a signal-to-noise threshold. It may be determined that the sensed sound includes the target sound if the signal-to-noise ratio is greater than the signal-to-noise threshold. On the other hand, it may be determined that the sensed sound includes a noise if the signal-to-noise ratio is not greater than the signal-to-noise threshold.

At 204, a target location of the target is determined according to the target sound.

For example, the target location may be determined according to detector locations of the sound detectors and detection time points at which the sound detectors detect the target sound, respectively, and a sound velocity.

In some embodiments, four sound detectors may be selected, and the target location may be determined according to detector locations of the four sound detectors and detection time points at which the four sound detectors detect the target sound, respectively.

Figure 4:
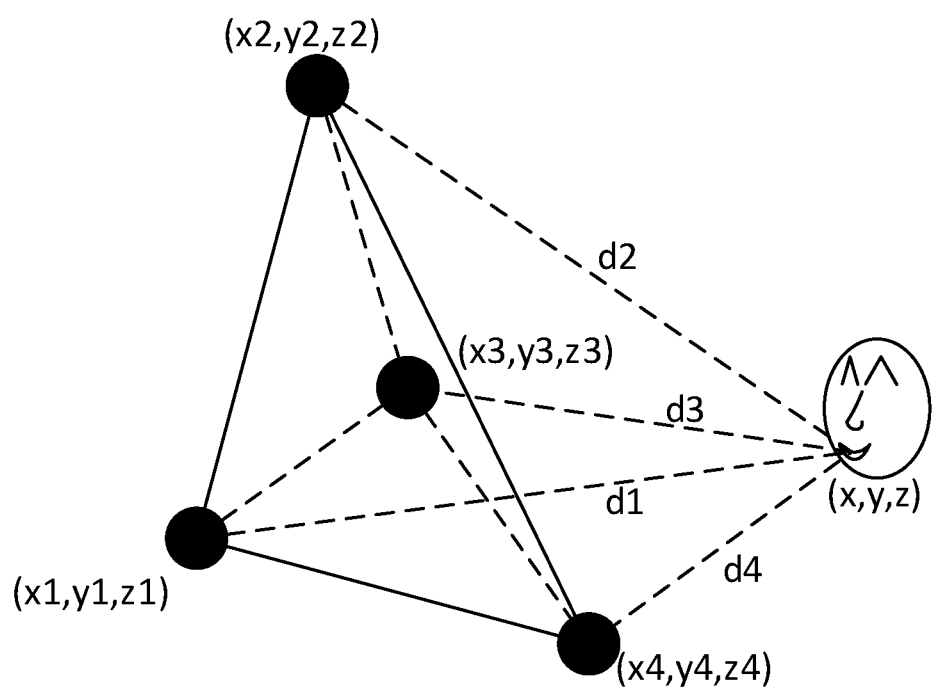
FIG. 4 illustrates a schematic view of detecting a target location using four sound detectors according to various disclosed embodiments of the present disclosure.

For example, using four sound detectors as an example, the target location may be determined according to a set of distance-velocity-time equations. For example, as shown in FIG. 4, a human face at a location (x,y,z), as an example of target, generates sounds. The sounds travel at a sound velocity v from the target, and reach four detectors indicated by four solid dots. The four detectors, i.e., the first to fourth detects, are located at (x1,y1,z1), (x2,y2,z2), (x3,y3,z3), and (x4,y4,z4), respectively, and the distances between the target and the four detectors are d1, d2, d3, and d4 respectively. A first detection time point at which the first sound detector detects the target sound is indicated by t1, a second detection time point at which the second sound detector detects the target sound is indicated by t2, a third detection time point at which the third sound detector detects the target sound is indicated by t3, a fourth detection time point at which the fourth sound detector detects the target sound is indicated by t4. Because $d1 = v \cdot t1$ and $d1 = \sqrt{(x-x1)^2 + (y-y1)^2 + (z-z1)^2}$, the following equation can be obtained:

$$\sqrt{(x-x1)^2 + (y-y1)^2 + (z-z1)^2} = v \cdot t1 \quad (1)$$

Similarly, for the other three sound detectors:

$$\sqrt{(x-x2)^2 + (y-y2)^2 + (z-z2)^2} = v \cdot t2 \quad (2)$$

$$\sqrt{(x-x3)^2 + (y-y3)^2 + (z-z3)^2} = v \cdot t3 \quad (3)$$

$$\sqrt{(x-x4)^2 + (y-y4)^2 + (z-z4)^2} = v \cdot t4 \quad (4)$$

Combining Equations (1) and (2) results:

$$\sqrt{(x-x2)^2 + (y-y2)^2 + (z-z2)^2} - \sqrt{(x-x1)^2 + (y-y1)^2 + (z-z1)^2} = v \cdot (t2 - t1) \quad (5)$$

Similarly, combining Equations (1) and (3) results:

$$\sqrt{(x-x3)^2 + (y-y3)^2 + (z-z3)^2} - \sqrt{(x-x1)^2 + (y-y1)^2 + (z-z1)^2} = v \cdot (t3 - t1) \quad (6)$$

Combining Equations (1) and (4) results:

$$\sqrt{(x-x4)^2 + (y-y4)^2 + (z-z4)^2} - \sqrt{(x-x1)^2 + (y-y1)^2 + (z-z1)^2} = v \cdot (t4 - t1) \quad (7)$$

Equations (5), (6), and (7) are an example of the distance-velocity-time equations. According to Equations (5), (6), and (7), the target location (x,y,z) can be determined.

At 206, the mobile platform is controlled based at least in part on the target location.

In some embodiments, the mobile platform is controlled based at least in part on the target location, to cause the sensor point approximately toward the target and/or further to finetune the sensor with respect to the target.

In some embodiments, the mobile platform may be controlled to perform an operation such as causing the sensor to point approximately toward the target or further to finetune the sensor with respect to the target. That is, so long as the mobile platform detects the target sound from the target, the mobile platform performs the operation. In some other embodiments, the mobile platform may response to a sound instruction included in the target sound. For example, the mobile platform may perform the operation only when the target sound includes the sound instruction but does not perform the operation if the target sound does not include the sound instruction. The sound instruction may be pre-pre-programmed in the mobile platform or be pre-recorded by a user. The sound instruction may include, for example, "hello, this direction" or "this way."

Figure 5:
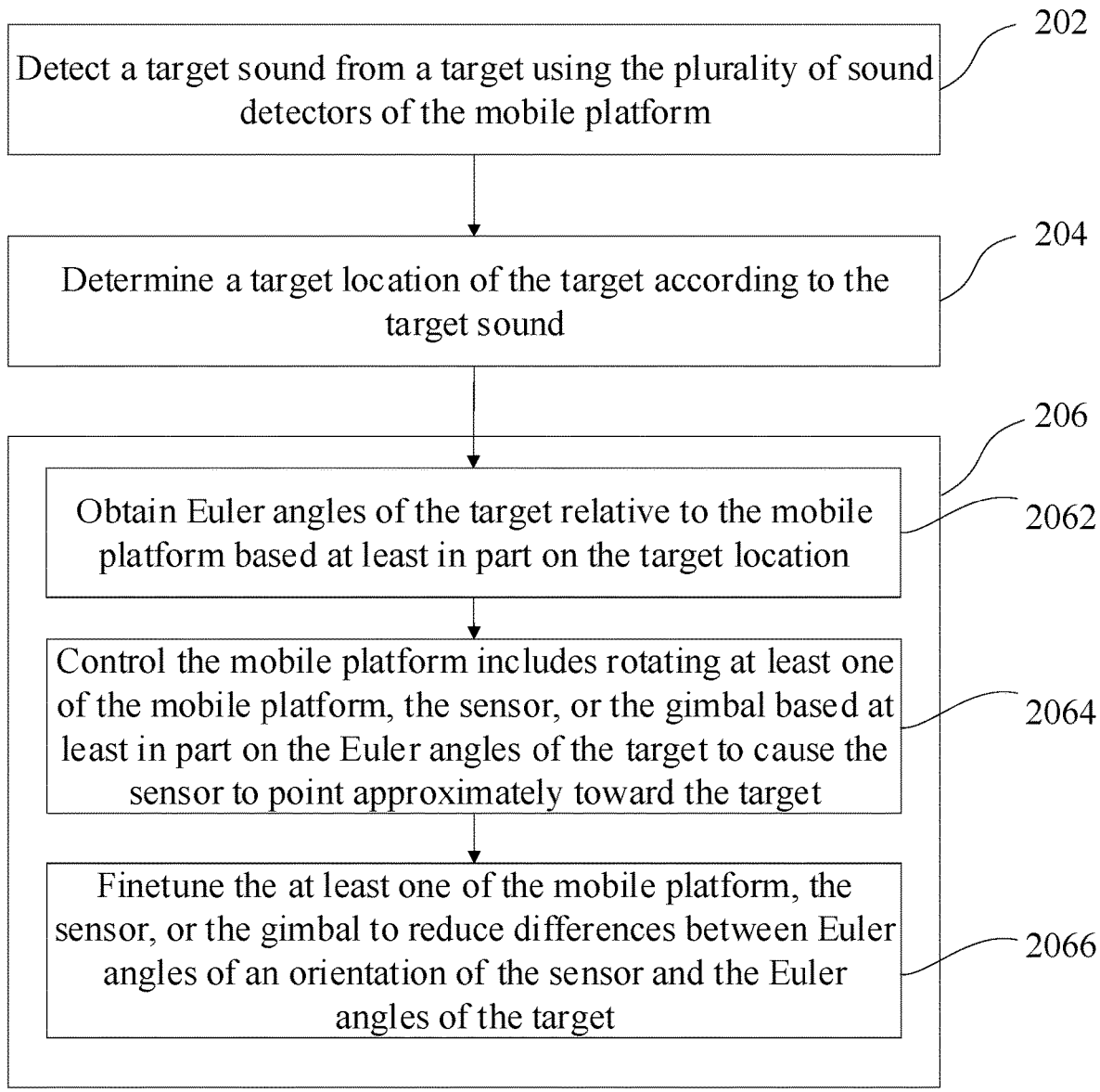
FIG. 5 is a flow chart of another exemplary photographing control method according to various disclosed embodiments of the present disclosure.

In some embodiments, process 206 may be performed for causing the sensor to point approximately toward the target and finetuning the sensor based on Euler angles of the target relative to the mobile platform, as shown in FIG. 5. FIG. 5 is a flow chart of another exemplary photographing control method according to various disclosed embodiments of the present disclosure.

As shown in FIG. 5, controlling the mobile platform based at least in part on the target location (206) includes obtaining the Euler angles of the target relative to the mobile platform based at least in part on the target location (2062) and rotating at least one of the mobile platform, the sensor, or the gimbal based at least in part on the Euler angles of the target to cause the sensor to point approximately toward the target (2064).

In some embodiments, the sensor may be caused to point approximately toward the target with a tolerance with respect to a direction of the target. That is, the sensor does not have to point exactly at the direction of the target. Rather, the sensor can point at a direction having an angle with the direction of the target smaller than the tolerance. The direction of the target refers to a direction pointing from the sensor to the target. The direction at which the sensor points is also referred to as a pointing direction of the sensor or an orientation of the sensor, which can be the orientation of a central measurement axis of the sensor. For example, the sensor may include a camera and the orientation of the sensor may be the orientation of the optical axis of a lens of the camera.

In some embodiments, the tolerance may be less than approximately 20 degrees, less than approximately 15 degrees, less than approximately 10 degrees, or less than approximately 5 degrees. In some embodiments, the tolerance may be approximately 20 degrees, approximately 15 degrees, approximately 10 degrees, or approximately 5 degrees.

Figure 6:
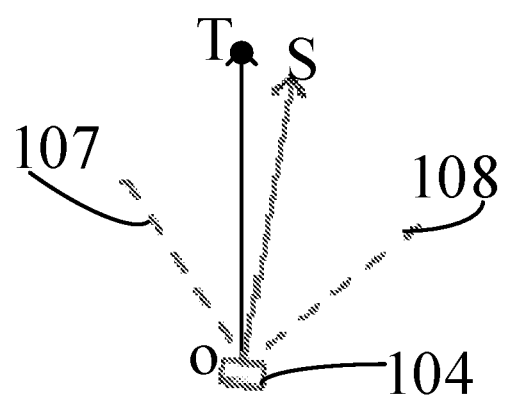
FIG. 6 illustrating examples of an orientation of a sensor and a direction of a target according to various disclosed embodiments of the present disclosure.

For example, as shown in FIG. 6, the sensor 104 is at position O, and the target is at position T. Arrowed line OT represents the direction from the sensor to the target, i.e., the direction of the target. The sensor may be caused to point approximately toward the target, e.g., along direction OS. As a result of the rotation of the at least one of the mobile platform, the sensor, or the gimbal as controlled according to the method consistent with the disclosure, the angle SOT between OS and OT may be controlled to be within the tolerance, for example, about 3 degrees, about 6 degrees, or about 9 degrees.

In some embodiments, the sensor may be coupled to an electric motor, and the electric motor coupled to the sensor may be controlled to rotate the sensor. In some embodiments, the sensor may be carried by the gimbal coupled to another electric motor, and the electric motor coupled to the gimbal may be controlled to rotate the gimbal. Further, the mobile platform carrying the sensor may include a propelling system, and the propelling system may be controlled to rotate the mobile platform so as to rotate the sensor.

In some embodiments, the Euler angles of the target may include at least one of a pitch angle, a roll angle, or a yaw angle of the target relative to the mobile platform, and the at least one of the mobile platform, the sensor, or the gimbal may be rotated rotating the at least one of the mobile platform, the sensor, or the gimbal according to at least one of the pitch angle of the target, the roll angle of the target, or the yaw angle of the target.

In some embodiments, the gimbal may include at least one of a pitch shaft, a yaw shaft, or a roll shaft, and rotating the at least one of the mobile platform, the sensor, or the gimbal based at least in part on the Euler angles of the target may be performed by rotating the at least one of the pitch shaft, the yaw shaft, or the roll shaft of the gimbal according to the at least one of the pitch angle, the roll angle, or the yaw angle of the target.

In some embodiments, the sensor may include a camera, and the at least one of the mobile platform, the sensor, or the gimbal may be rotated according to the Euler angles of the target to cause the camera to point approximately toward the target. Similar to the embodiments described above, in some embodiments, rotation of the at least one of the mobile platform, the sensor, or the gimbal according to the Euler angles of the target may be performed when the mobile platform receives the target sound; while in some other embodiments, the rotation of the at least one of the mobile platform, the sensor, or the gimbal according to the Euler angles of the target may be performed in response to a sound instruction included in the target sound.

In some embodiments, as shown in FIG. 5, controlling the mobile platform based at least in part on the target location (206) further includes finetuning the at least one of the mobile platform, the sensor, or the gimbal to reduce differences between Euler angles of an orientation of the sensor and the Euler angles of the target.

Measurement data about the target may be obtained through the sensor, a finetune parameter may be obtained according to the measurement data and the orientation of the sensor, and the at least one of the mobile platform, the sensor, or the gimbal may be finetuned according to the finetune parameter.

In some embodiments, the sensor includes a camera and the camera can be configured to capture a target image containing the target. The target image may contain information associated with the target. A finetune parameter may be obtained according to the target image and an orientation of the camera. The finetune parameter may include one or more sub-parameters describing differences between the Euler angles of the orientation of the sensor and the Euler angles of the target.

In some embodiments, to obtain the finetune parameter, an orientation difference may be obtained according to a position of the target in the target image and the orientation of the camera. The one or more sub-parameters may be obtained according to the orientation difference. Further, the at least one of the mobile platform, the sensor, or the gimbal may be finetuned according to the finetune parameter. For example, the at least one of the mobile platform, the camera, or the gimbal may be rotated according to the one or more sub-parameters, such that the differences between Euler angles of the orientation of the sensor and the Euler angles of the target may be reduced.

In some embodiments, the target may include a human face, and data for the human face may be pre-registered. The pre-registered data for the human face may be used for searching the human face in an image captured by the camera. Accordingly, a relative location of the human face in the image may be determined relatively conveniently. In some other embodiments, pre-registered data for the human face may not be used for searching the human face in an image captured by the camera. Whether the pre-registered data for the human face is used may be chosen according to various application scenarios.

In some embodiments, the target may move, and the at least one of the mobile platform, the sensor, or the gimbal may be repeatedly finetuned to reduce differences between the Euler angles of the orientation of the sensor and the Euler angles of the target. Accordingly, the target may be continuously tracked, and images of the target may be captured as needed.

Figure 7:
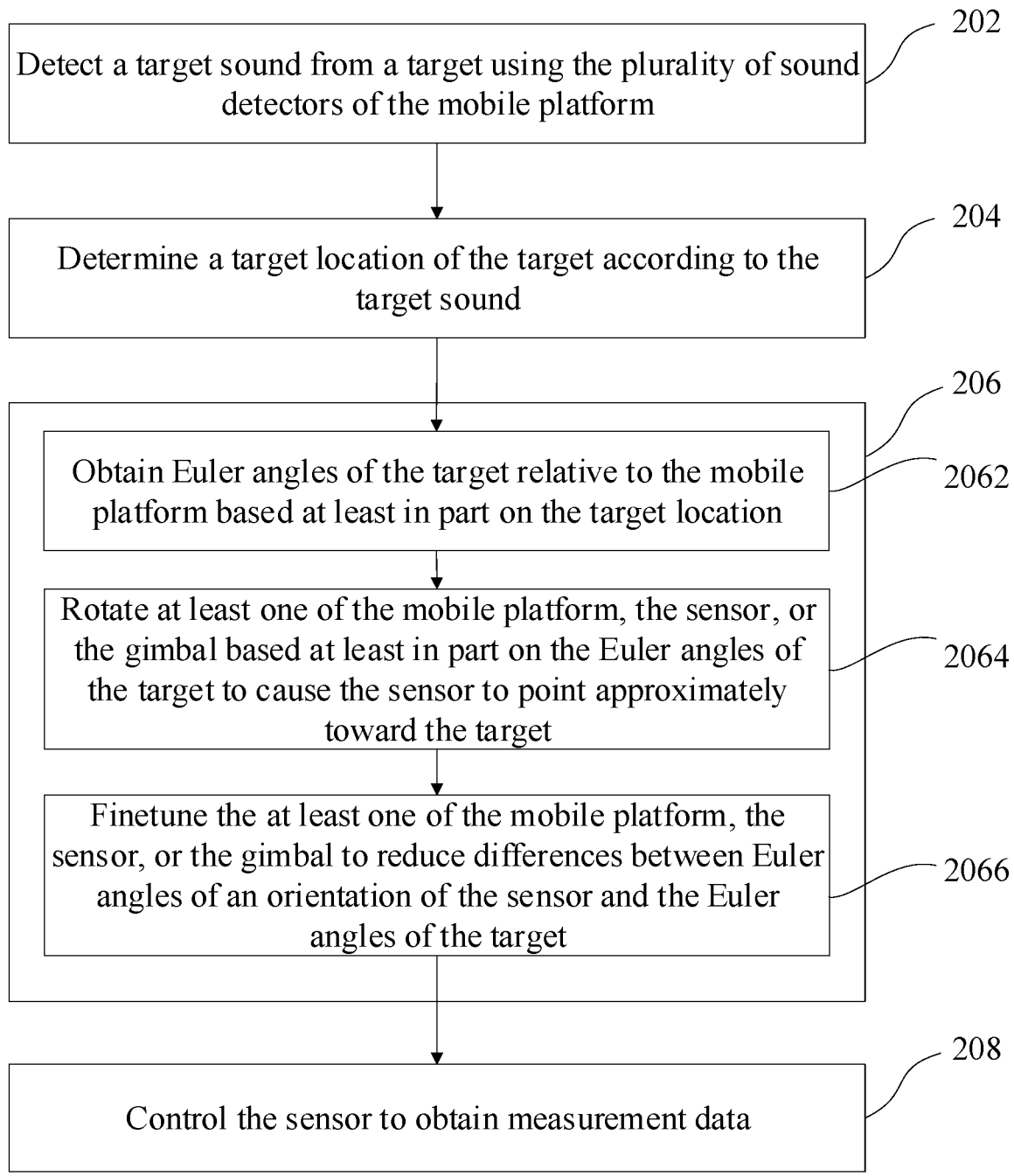
FIG. 7 is a flow chart of another exemplary photographing control method according to various disclosed embodiments of the present disclosure.

FIG. 7 is a flow chart of another exemplary photographing control method according to various disclosed embodiments of the present disclosure. The method shown in FIG. 7 is similar to the method shown in FIG. 5, except that the method shown in FIG. 7 further includes controlling the sensor to obtain measurement data (208).

In some embodiments, the sensor may be controlled to obtain the measurement data for controlling the mobile platform based at least in part on the target location. That is, the measurement data may be used in the process of controlling the mobile platform. In some embodiments, the mobile platform is controlled, and further the sensor may be controlled to obtain the measurement data. For example, the mobile platform is controlled to cause the sensor to point approximately toward the target and/or further to finetune the sensor with respect to the target. Further, the sensor may be controlled to obtain the measurement data.

In some embodiments, the sensor may be caused to point approximately toward the target with a tolerance of, e.g., approximately 10 degrees with respect to the direction of the target. Referring again to FIG. 6, the sensor 104 has a measurement field of, for example, approximately 85 degrees. That is, objects within approximately 42.5 degrees on both sides of a central measurement axis OS of the sensor are within the measurement field. In FIG. 6, the measurement field covers the region between two dashed lines 107 and 108. When the target is within the measurement field of the sensor, such as shown in FIG. 6, the sensor can take measurement data on the target. In the embodiments that the sensor includes a camera, the measurement field can be the field of view of the camera, and when the target is within the field of view of the camera, the camera can capture images of the target, i.e., the measurement data may include an image.

In some embodiments, the sensor may include a camera, and the target may include a human face. In response to an image-capturing sound instruction included in the target sound, e.g., a sound instruction of "take a picture" or "take a picture, OSMO," the at least one of the mobile platform, the sensor, or the gimbal may be rotated according to the Euler angles of the target to cause the camera to point approximately toward the target, and finetuned to reduce differences between the Euler angles of an orientation of the camera and the Euler angles of the target. Further, an image of the target may be captured and saved.

In some embodiments, the sound detectors may also be moved, e.g., rotated, so that they can be oriented at the target to improve the quality of the target sound. In some embodiments, the mobile platform may carry and move sound detectors without using a gimbal. In some other embodiments, the mobile platform may carry and move some or all of the sound detectors through the gimbal.

Figure 8:
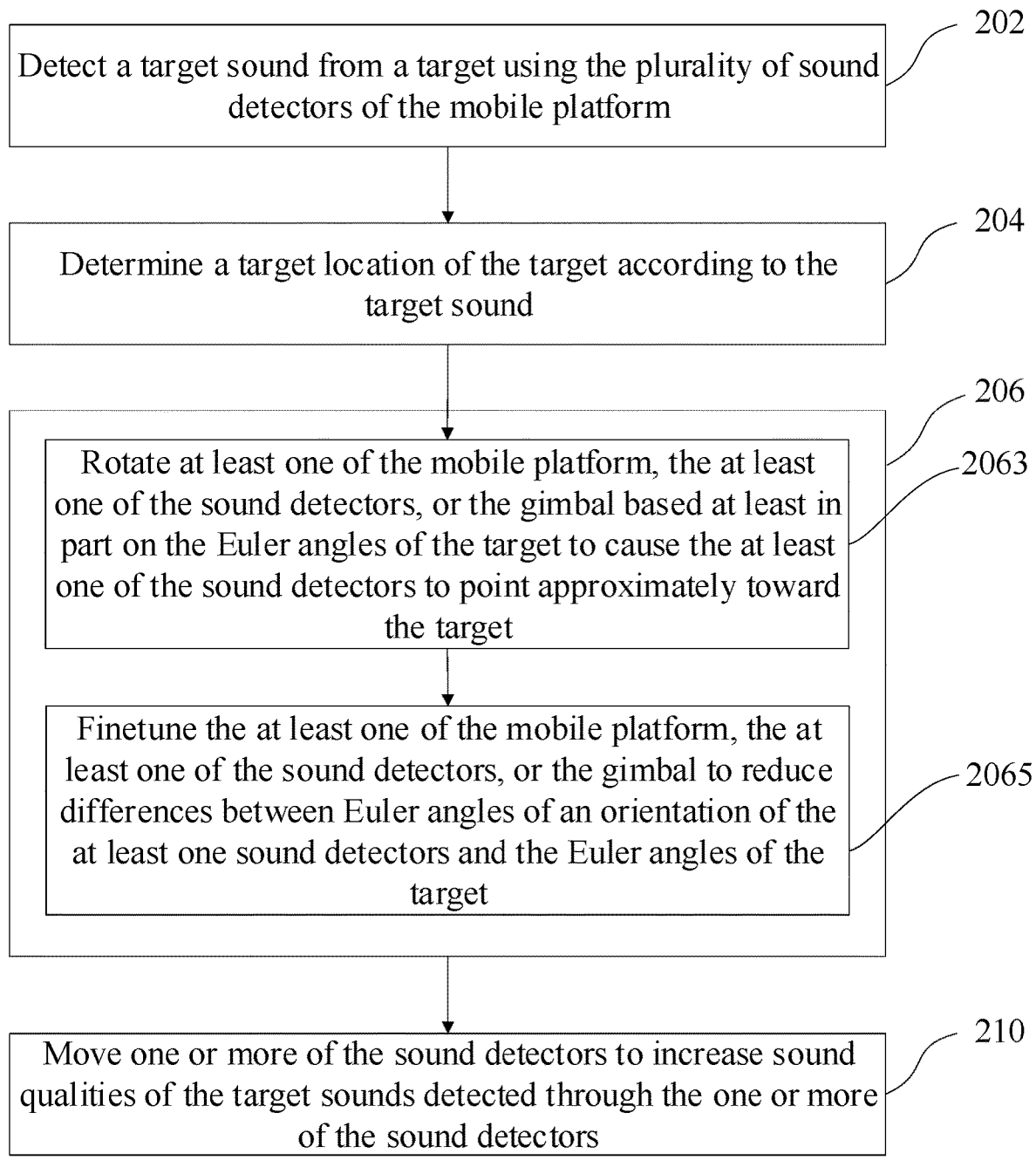
FIG. 8 is a flow chart of another exemplary photographing control method according to various disclosed embodiments of the present disclosure.

FIG. 8 is a flow chart of another exemplary photographing control method according to various disclosed embodiments of the present disclosure. As shown in FIG. 8, controlling the mobile platform based at least in part on the target location (206) includes rotating at least one of: the mobile platform, at least one sound detector, or the gimbal based at least in part on the Euler angles of the target to cause the at least one sound detector to point approximately toward the target.

The sound qualities of sounds detected by the sound detectors may be improved by causing the at least one sound detector to point approximately toward the target.

In some embodiments, as shown in FIG. 8, controlling the mobile platform based at least in part on the target location (206) further includes finetuning the at least one of: the mobile platform, the at least one sound detector, or the gimbal, to reduce differences between Euler angles of an orientation of the at least one sound detector and the Euler angles of the target (206S).

The finetuning to reduce differences between Euler angles of an orientation of the at least one sound detector and the Euler angles of the target may be performed by arranging a sensor pointing in an approximately same direction as the at least one sound detector. That is, the sensor can be a directional sensor and a sensing direction of the sensor can be approximately the same as a detection direction of the at least one sound detector. The sensor may have a relatively better accuracy of determining a target direction than the at least one sound detector, and thus the finetuning can be realized. The sensor can include, for example, a sensor described above in connection with FIG. 5 or any other suitable sensor. Because the sensor points in approximately the same direction as the at least one sound detector, differences between Euler angles of the orientation of the at least one sound detector and the Euler angles of the target can be reduced by reducing differences between Euler angles of an orientation of the sensor and the Euler angles of the target. Thus, differences between the Euler angles of the orientation of the at least one sound detector and the Euler angles of the target can be reduced by finetuning the at least one of the mobile platform, the at least one sound detector, or the gimbal in a similar manner as reducing differences between the Euler angles of the orientation of the sensor and the Euler angles of the target, descriptions of which is not repeated here.

Besides the pointing direction, i.e., the orientation, of a sound detector, e.g., whether sound detector point toward the target, other factors, such as a noise, e.g., a wind noise, and a direction of the noise may also influence sound quality of the target sound detected by the sound detector. Influences of different factors may vary according to application scenarios, and different approaches may be adopted according to different application scenarios. For example, in the scenarios that a wind noise has a relatively larger influence than the orientation of the sound detector, sound quantity may be better improved by reducing the influence of the wind noise than pointing the sound detector toward the target.

In some embodiments, as shown in FIG. 8, the method further includes moving one or more of the sound detectors to increase sound qualities of the target sounds detected by the one or more of the sound detectors (210).

The one or more of the sound detectors may be moved, e.g., rotated, by moving, e.g., rotating, at least one of the mobile platform, at least one of the sound detectors, or the gimbal to reduce other influences, such as noise, e.g., wind noise, detected by the one or more of the sound detectors, such that the sound qualities of the target sounds detected by the one or more of the sound detectors are improved.

In some embodiments, the one or more of the sound detectors may be moved together with the mobile platform. In some embodiments, the one or more of the sound detectors may be moved with respect to the mobile platform, e.g., through a gimbal carried by the mobile platform and connecting to the one or more of the sound detectors. That is, the one or more of the sound detectors may be moved with respect to the platform body.

In some embodiments, increased sound quality of the target sounds may be indicated by increased intensity of the target sound and/or increased signal-to-noise ratio of the target sound.

In the present disclosure, sound detectors corresponding to sounds with higher sound qualities may be determined. For example, at least one of the sound detectors that detects the target sound with a higher sound quality than other one or more of the sound detectors may be determined. Further, the at least one of the sound detectors may be selected as at least one channel to record an additional sound from the target.

In some embodiments, the sensor may include a camera and two of the sound detectors may be determined as sound detectors that detect the target sound with higher sound quality than other one or more of the sound detectors. The two of the sound detectors may be selected as two channels to record the additional sound to integrate into a video taken by the camera. Accordingly, the video may include sound of relatively higher sound quality.

Figure 9:
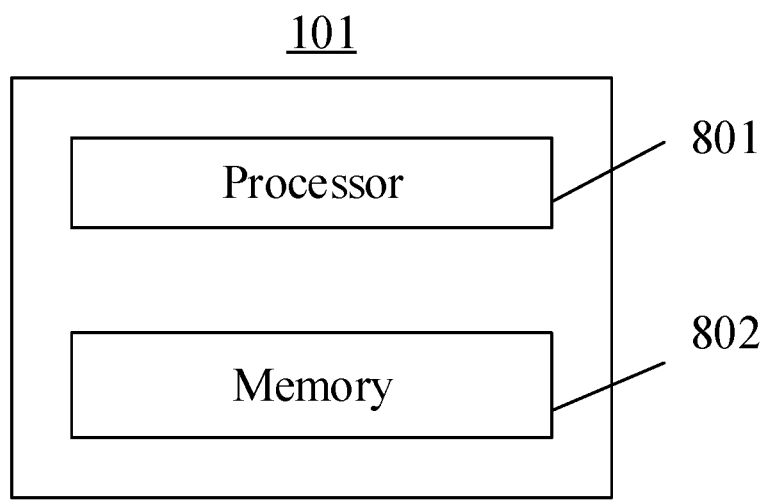
FIG. 9 illustrates a block diagram of an exemplary hardware configuration of an exemplary controller according to various disclosed embodiments of the present disclosure.

FIG. 9 illustrates a block diagram of an exemplary hardware configuration of an exemplary controller 101 according to various disclosed embodiments of the present disclosure. As shown in FIG. 9, the controller 101 includes a processor 801 and a memory 802. The memory 802 stores instructions for execution by the processor 801 to perform a method consistent with the disclosure, such as one of the exemplary photographing control methods described above.

In some embodiments, the processor 801 may include any suitable hardware processor, such as a microprocessor, a micro-controller, a central processing unit (CPU), a graphic processing unit (GPU), a network processor (NP), a digital signal processor (DSP), an application specific integrated circuit (ASIC), a field-programmable gate array (FPGA), or another programmable logic device, discrete gate or transistor logic device, discrete hardware component. In some embodiments, the memory 802 may include a non-transitory computer-readable storage medium, such as a random access memory (RAM), a read only memory, a flash memory, a hard disk storage, or an optical medium.

In some embodiments, the instructions stored in the memory, when executed by the processor, may cause the processor to detect a target sound from a target using the plurality of sound detectors of the mobile platform.

The target may include, for example, a human face or an object that can generate sounds.

In some embodiments, the instructions may further cause the processor to determine a target location of the target according to the target sound.

For example, the target location may be determined according to detector locations of the sound detectors and detection time points at which the sound detectors detect the target sound, respectively, and a sound velocity.

In some embodiments, the instructions may further cause the processor to control the mobile platform based at least in part on the target location.

In some embodiments, the mobile platform is controlled based at least in part on the target location, to cause the sensor point approximately toward the target or further to finetune the sensor with respect to the target.

In some embodiments, the mobile platform may be controlled to perform an operation such as causing the sensor to point approximately toward the target or further to finetune the sensor with respect to the target. That is, so long as the mobile platform detects the target sound from the target, the mobile platform performs the operation. In some other embodiments, the mobile platform may response to a sound instruction included in the target sound. For example, the mobile platform may perform the operation only when the target sound includes the sound instruction but does not perform the operation if the target sound does not include the sound instruction. The sound instruction may be pre-preprogrammed in the mobile platform or be pre-recorded by a user. The sound instruction may include, for example, "hello, this direction" or "this way."

In some embodiments, the instructions may further cause the processor to control the sensor to obtain measurement data.

In some embodiments, the sensor may be controlled to obtain the measurement data for controlling the mobile platform based at least in part on the target location. That is, the measurement data may be used in the process of controlling the mobile platform. In some embodiments, the mobile platform is controlled, and further the sensor may be controlled to obtain the measurement data. For example, the mobile platform is controlled to cause the sensor to point approximately toward the target and/or further to finetune the sensor with respect to the target. Further, the sensor may be controlled to obtain the measurement data.

The instructions can cause the processor to perform a method consistent with the disclosure, such as one of the example methods described above.

For details of the functions of the above-described devices or functions of the components of a device, references can be made to method embodiments described above, descriptions of which are not repeated here.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computing device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A photographing control method comprising:
    detecting a target sound from a target using a plurality of sound detectors of a mobile platform carrying a sensor, the mobile platform including a gimbal carrying the sensor;
    determining a target location of the target according to the target sound detected using the plurality of sound detectors;
    obtaining Euler angles of the target relative to the mobile platform based at least in part on the target location; and
    controlling the mobile platform based at least in part on the target location, including:
        rotating at least one of the mobile platform, the sensor, or the gimbal based at least in part on the Euler angles of the target to cause the sensor to point approximately toward the target; and
        finetuning the at least one of the mobile platform, the sensor, or the gimbal to reduce differences between Euler angles of an orientation of the sensor and the Euler angles of the target, including:
            obtaining measurement data about the target through the sensor;
            obtaining a finetune parameter according to the measurement data and the orientation of the sensor; and
            finetuning the at least one of the mobile platform, the sensor, or the gimbal according to the finetune parameter.

2. The method according to claim 1, wherein each two of the sound detectors have a distance between the two of the sound detectors larger than a preset value.

3. The method according to claim 1, wherein detecting the target sound includes:
    obtaining an intensity of a sensed sound detected through one of the sound detectors;
    determining whether the intensity of the sensed sound is greater than an intensity threshold; and
    determining that the sensed sound includes the target sound in response to determining that the intensity of the sensed sound is greater than the intensity threshold.

4. The method according to claim 3, wherein detecting the target sound further includes, in response to determining that the intensity of the sensed sound is not greater than the intensity threshold:
    performing a frequency-dependent intensity analysis on the sensed sound to obtain a signal-to-noise ratio;
    determining whether the signal-to-noise ratio is greater than a signal-to-noise threshold;
    determining that the sensed sound includes the target sound in response to determining that the signal-to-noise ratio is greater than the signal-to-noise threshold; and
    determining that the sensed sound includes a noise in response to determining that the signal-to-noise ratio is not greater than the signal-to-noise threshold.

5. The method according to claim 1, wherein determining the target location includes:
    determining the target location according to detector locations of the sound detectors and detection time points at which the sound detectors detect the target sound, respectively.

6. The method according to claim 5, wherein determining the target location includes:
    determining the target location according to the detector locations, the detection time points, and a sound velocity.

7. The method according to claim 6, wherein determining the target location according to the detector locations, the detection time points, and the sound velocity includes:
    determining the target location according to a set of distance-velocity-time equations each describing a relationship among:
        a first distance between a first one of the sound detectors and the target expressed in terms of the detector location of the first one of the sound detectors and the target location,
        a second distance between a second one of the sound detectors and the target expressed in terms of the detector location of the second one of the sound detectors and the target location, and
        a time difference between the detection time point of the first one of the sound detectors and the detection time point of the second one of the sound detectors.

8. The method according to claim 1, wherein:
    the sensor includes a camera, and
    finetuning the at least one of the mobile platform, the sensor, or the gimbal further includes:
        capturing a target image of the target through the camera; and
        obtaining the finetune parameter according to the target image and an orientation of the camera.

9. The method according to claim 1, wherein rotating the at least one of the mobile platform, the sensor, or the gimbal includes performing at least one of:
    controlling a propelling system of the mobile platform to rotate the mobile platform,
    controlling an electric motor coupled to the sensor to rotate the sensor, or
    controlling an electric motor coupled to the gimbal to rotate the gimbal.

10. The method according to claim 1, wherein:
the Euler angles of the target include at least one of a pitch angle, a roll angle, or a yaw angle of the target relative to the mobile platform;
the gimbal includes at least one of a pitch shaft, a yaw shaft, or a roll shaft; and
rotating the at least one of the mobile platform, the sensor, or the gimbal based at least in part on the Euler angles of the target includes:
performing at least one of:
rotating the at least one of the mobile platform, the sensor, or the gimbal according to the pitch angle of the target,
rotating the at least one of the mobile platform, the sensor, or the gimbal according to the roll rotation angle of the target, or
rotating the at least one of the mobile platform, the sensor, or the gimbal according to the yaw angle of the target; or
rotating the at least one of the pitch shaft, the yaw shaft, or the roll shaft of the gimbal according to the at least one of the pitch angle, the roll angle, or the yaw angle of the target relative to the mobile platform.

11. The method according to claim 1, wherein:
the sensor includes a camera, and
rotating the at least one of the mobile platform, the sensor, or the gimbal includes:
rotating the at least one of the mobile platform, the sensor, or the gimbal according to the Euler angles of the target to cause the camera to point approximately toward the target; or
in response to a sound instruction included in the target sound, rotating the at least one of the mobile platform, the sensor, or the gimbal according to the Euler angles of the target to cause the camera to point approximately toward the target.

12. The method according to claim 1, wherein:
the gimbal further carries at least one of the sound detectors; and
controlling the mobile platform based at least in part on the target location further includes rotating at least one of the mobile platform, the at least one of the sound detectors, or the gimbal based at least in part on the Euler angles of the target to cause the at least one of the sound detectors to point approximately toward the target.

13. The method according to claim 1, further comprising:
determining at least one of the sound detectors that detects the target sound with a higher intensity than other one or more of the sound detectors or that detects a sensed sound with a higher signal-to-noise ratio than other one or more of the sound detectors; and
selecting the at least one of the sound detectors as at least one channel to record an additional sound from the target.

14. The method according to claim 13, wherein:
the at least one of the sound detectors include two of the sound detectors;
the sensor includes a camera; and
selecting the at least one of the sound detectors includes selecting the two of the sound detectors as two channels to record the additional sound to integrate into a video taken by the camera.

15. The method according to claim 13, wherein:
the gimbal further carries at least one of the sound detectors; and
controlling the mobile platform based at least in part on the target location further includes rotating at least one of the mobile platform, the at least one of the sound detectors, or the gimbal based at least in part on the Euler angles of the target to cause the at least one of the sound detectors to point approximately toward the target.

16. The method according to claim 1, further comprising:
moving or rotating one or more of the sound detectors with respect to the mobile platform to increase intensities of the target sounds detected through the one or more of the sound detectors or to increase signal-to-noise ratios of sensed sounds detected by the one or more of the sound detectors.

* * * * *